United States Patent

[11] 3,619,208

[72] Inventors Bernard J. Bahoshy;
 Robert R. Ferguson; Joseph L. Hegadorn,
 all of Dover, Del.
[21] Appl. No 754,471
[22] Filed Aug. 21, 1968
[45] Patented Nov. 9, 1971
[73] Assignee General Foods Corporation
 White Plains, N.J.

[54] PUDDING MIX COMPOSITION
 11 Claims, No Drawings
[52] U.S. Cl. ................................................. 99/139
[51] Int. Cl. ............................................ A23l 1/14
[50] Field of Search ............................... 99/139, 131

[56] References Cited
 UNITED STATES PATENTS
 2,438,855  3/1948  Kerr et al. ................. 99/139 X

| 2,461,139 | 2/1949 | Caldwell | 99/139 X |
| 2,733,238 | 1/1956 | Kerr et al. | 99/139 X |
| 2,801,923 | 8/1957 | Stoloff | 99/131 X |
| 2,852,393 | 9/1958 | Kerr et al. | 99/139 |
| 3,231,391 | 1/1966 | Breivik | 99/139 |
| 3,257,214 | 6/1966 | McDermott | 99/131 X |

OTHER REFERENCES

Atlas Surfactants, Atlas Chemical Industries Wilmington, Delaware, 1963 p. 4.

*Primary Examiner*—Raymond N. Jones
*Assistant Examiner*—J. M. Hunter
*Attorneys*—Thomas V. Sullivan and Bruno P. Struzzi

ABSTRACT: A pudding mix composition includes, in combination with an amylaceous ingredient, a modified amylaceous ingredient. The preparation of a pudding therefrom is considerably simpler and is more tolerant of preparation errors.

PUDDING MIX COMPOSITION

BRIEF SUMMARY OF THE INVENTION

This invention relates to a pudding mix composition and more particularly to a pudding mix composition in the form of a dry powder which may be mixed with water and/or milk and cooked to form a pudding of superior characteristics. Still more particularly, this invention relates to a pudding mix composition offering considerable advantages to the consumer and housewife in preparing a cooked pudding therefrom.

Pudding mix compositions presently available may generally be classified as two types; instant and cooked. In the so-called instant puddings, the characteristic firmness and texture is usually obtained by the use of coagulating agents such as calcium salts, phosphate salts, enzymes and the like. These coagulating agents serve to act on the milk protein and to modify it in a manner whereby added thickening agents as, for example, pregelatinized starches, gums, hydrocolloids, and the like, are employed so as to furnish additional firmness and texture to the pudding. On the other hand, in cooked puddings the desired firmness and texture are achieved by the use of raw starches or other amylaceous materials including cornstarch, potato starch, tapioca starch, rye flour, wheat flour, and the like. In conventional cooked pudding mix compositions, raw cornstarch is widely used as the sole setting or gelling agent and during cooking the starch is converted, by gelatinization, to the sought-after firmness and texture associated with cooked puddings. However, unless care in preparation is exercised, a conventional cornstarch-containing cooked pudding may be either thin and runny or firm and pasty. It appears that these undesired textures in the finished pudding are traceable to the cornstarch which has a rather narrow range of optimum gelatinization temperatures. Consequently, only if the cornstarch-containing pudding mix composition is cooked at these gelatinization temperatures, and for times which may also be considered critical, the resultant pudding texture is either thin or firm. While proper agitation and stirring of the pudding mix and reconstituting liquid may offset some of the need to carefully control the temperatures and times for cooking, they require constant attention on the part of the consumer and housewife in the preparation of the pudding.

Although attempts have been made to avoid these disadvantages of conventional cooked pudding mix compositions, such efforts have not been wholly successful. For example, potato starch, tapioca starch, rye flour, wheat flour, and combinations thereof have been substituted for all or part of the cornstarch to provide pudding mix compositions which do not have to be cooked to a "full rolling boil" during preparation. Yet, the resultant puddings lack, to a certain extent, desired texture and taste. Moreover, when such "no-boil" pudding mix compositions are permitted to be cooked to a full boil or beyond—a frequent occurrence because of a consumer or housewife overlooking recipe directions or being interrupted in the preparation of the cooked pudding—the puddings are excessively firm and/or pasty and/or gummy.

It is an object of this invention to provide a pudding mix composition which is adapted to furnish a fully acceptable pudding regardless of whether the product is cooked to less than a boil, the first sign of a boil, full boil, or even beyond.

It is a further object of this invention to provide a pudding mix composition which is adapted to furnish a pudding which may be described as neither thin nor firm and during the preparation of which the need for constant stirring is reduced.

The foregoing objects as well as others are realized by including in a pudding mix composition containing an amylaceous ingredient a modified amylaceous ingredient.

DETAILED DESCRIPTION

The modified amylaceous ingredient is one characterized by its gel point being lower than that of an unmodified, raw starch of the same type. On cooking the pudding mix composition, a pudding of controlled texture is obtained. Although raw starches may be modified by any of a number of methods including acid treatment, bleaching, oxidation, esterification, etherification and combinations thereof, it appears that a raw starch which has been etherified and/or esterified is especially suitable in the pudding mix composition of this invention. More particularly, it would seem that a starch which has been etherified and/or esterified so as to introduce epichlorohydrin and/or succinyl groups thereinto is most advantageously employed. Such food starch, modified may, for purposes of this invention be designated as an etherified and/or esterified modified amylaceous ingredient. Cornstarch seems to be particularly well suited for such modifying treatment, and a modified cornstarch found especially useful in the pudding mix composition of this invention is a modified cornstarch identified as "Delta Food Starch 07444" offered by Anheuser-Busch, Inc.

In a preferred embodiment, the amylaceous ingredient is cornstarch and the modified amylaceous ingredient is a modified cornstarch. The modified cornstarch is one whose gelation characteristics have been substantially altered from those commonly found in raw cornstarch. The modified cornstarch is characterized by its minimized tendency toward retrogradation and by its ability to form a thick, clear, soft-textured gel when cooked to its gel point which is lower than that of an unmodified cornstarch. It appears that the modified cornstarch does not set up, that is, form a rigid, irreversible gel, but instead because of the minimized tendency toward retrogradation, control of the texture of the pudding is achieved.

The ratio of amylaceous ingredient to modified amylaceous ingredient may be from about 2 to 1 to about 8 to 1, by weight.

The pudding mix composition may also comprise other amylaceous ingredients such as potato starch, tapioca starch or flour and/or a thin boiling colloidal or cellulose gum system as provided for by including carrageenan, pectin, algin, or a cellulose derivative and combinations thereof. Such amylaceous ingredients may be present in amounts by weight ranging from 0 to about 50 percent of the principal or unmodified amylaceous ingredient. The colloids or gums while not essential, may be included in amounts, by weight, ranging from 0 to about 10 percent of the raw amylaceous ingredient. Preferably, seaweed extract gum as, for example, carrageenan or algin is employed so as to provide additional firmness in the pudding.

The pudding mix composition may also contain a lipid ester base surface active agent which imparts ease of wetting the ingredients thus further simplifying pudding preparation and also affording tolerance in recipe preparation. Such surface active agent may be any of a large number including mono- and diglycerides of fatty acids, polyoxyethylene ethers of mixed fatty acid esters of sorbitan, fatty acid esters of sorbitan, glycol esters of fatty acids and the like.

Other ingredients in the pudding mix composition may include sugars such as sucrose, dextrose, lactose, corn syrup solids and the like. Nonnutritive sweetening agents such as cyclamates, saccharins and the like may also be employed to replace all or part of the sugars. Salt, flavor, and color may, of course, be added to the pudding mix composition. If desired, nonfat or whole milk solids and bulking ingredients as, for example, nonsweetening carbohydrates may also be used.

Suitable levels in grams of the various ingredients for use with one pint of milk are, for example:

| | |
|---|---|
| Sugar | 40–80 |
| Raw Starch | 10–30 |
| Modified Starch | 3–15 |
| Flours or other raw starches | 0–15 |
| Colloid or gum | 0–3 |
| Salt | ¼–3 |
| Flavor/color | As needed |
| Surface active agent | 0–2 |

In order to illustrate, but not to limit, the present invention, the following examples are given:

EXAMPLE 1

A dry vanilla pudding mix is made by blending 55 parts of sucrose, 20 parts of dextrose, 20 parts of raw cornstarch, 4 parts of modified cornstarch ("Delta Food Starch 07444"), 1.5 parts of salt, and color and flavor as desired in a ribbon mixer for twenty minutes.

Three to 3½ ounces of the blended mix are added to two cups of whole milk. The admixture is then cooked to a boil over medium heat. The cooked pudding is then allowed to cool to develop its set.

EXAMPLE 2

The procedure of example 1 is repeated in all essential respects except that 0.15 part of calcium carrageenan is included in the formulation.

EXAMPLE 3

The procedure of example 2 is repeated in all essential respects except that 0.2 part of polyoxyethylene (20) sorbitan monostearate is included in the formulation.

EXAMPLE 4

A dry chocolate flavor pudding mix is made by blending 60 parts of sucrose, 15 parts of raw cornstarch, 13 parts of cocoa powder, 5 parts of modified cornstarch ("Delta Food Starch 07444"), 4 parts of tapioca flour, 1 part of salt, 0.3 part of calcium carrageenan, color and flavor as desired in a ribbon mixer for twenty minutes.

Three and one-half to 4 ounces of the blended mix are added to 2 cups of whole milk. The admixture is then cooked to a boil over medium heat. The cooked pudding is then allowed to cool to develop its set.

Pudding mix compositions of this invention were evaluated against commercially available cooked pudding mixes to determine ease of preparation and the texture and appearance of the puddings so prepared.

A summary of these comparative product ratings, and observations regarding texture and appearance tests, appears in the following table:

pudding mixes are cooked less, or more, than the indicated "full boil" or "partial boil," the textural characteristics and appearance are not optimum. Thus, it may be noted that very soft or soft textures are found when such pudding mixes are cooked to the "first sign of boil" and that pasty, tacky and/or gummy textures are observed when the mixes are cooked for an "extended boil" period. Consequently, it is apparent that the pudding mix compositions of the present invention are extremely tolerant of variations in recipe preparations. Such tolerance offers more convenience to the user as does the diminished need for stirring during cooking.

While the present invention has been described with particular reference to specific embodiments the same are not to be considered as being in any way limitative but rather reference should be had to the appended claims for a definition of the invention.

We claim:

1. A pudding mix composition comprising a mixture of from about two to about eight parts of a raw amylaceous ingredient per one part of a modified amylaceous ingredient, said modified amylaceous ingredient having a gel point lower than said raw amylaceous ingredient whereby on cooking said composition a pudding of controlled texture is obtained.

2. A composition as in claim 1 in which said raw amylaceous ingredient is selected from the group consisting of cornstarch, potato starch and tapioca starch.

3. A composition as in claim 2 in which said modified amylaceous ingredient is a modified cornstarch.

4. A composition as in claim 3 in which said modified cornstarch is a cornstarch treated with an agent selected from the group consisting of etherifying and esterifying agents and combinations thereof.

5. A composition as in claim 3 further comprising tapioca flour.

6. A composition as in claim 3, further comprising a member selected from the group consisting of carrageenan, pectin, algin and cellulose derivatives.

7. A composition as in claim 6 in which said member is carrageenan.

8. A composition as in claim 7 further comprising sugar, salt flavor, and color.

| Cook condition | Pudding mix composition | | Commercially available pudding mix | |
| --- | --- | --- | --- | --- |
| | Example 1 | Example 2 | "A" (cornstarch only) | "B" (cornstarch and carrageenan) |
| Thickening stage | Watery, not gelled | Slightly soft creamy | Watery, not gelled | Very soft, creamy. |
| First sign of boil | Slightly soft, very creamy. | Good, creamy | Very soft, watery | Soft, creamy. |
| Partial boil | Good, creamy | do | Slightly soft, creamy | Good, creamy. |
| Full boil | do | do | Good, creamy | Do. |
| Extended boil (30 seconds). | do | do | Fair, slightly pasty | Fair, slightly tacky, off taste. |
| Extended boil (60 seconds). | do | do | Pasty, gummy | Slightly tacky, caramelized off taste, gummy. |

The foregoing results indicate that with the pudding mix composition of this invention cooking to a "full boil" is not required to obtain a good quality pudding product. Moreover, even when the pudding mix compositions are cooked to stages beyond the specified "first sign of boil" the quality of the pudding, as is evidenced by controlled texture, is not diminished. By contrast, commercially available pudding mixes must be cooked to the proper stage in order to develop the desired texture in the puddings. Yet, when these same 9. A composition as in claim 4 further comprising tapioca flour.

10. A composition as in claim 4 further comprising a member selected from the group consisting of carrageenan, pectin, algin, and cellulose derivatives.

11. A composition as in claim 5 further comprising a member selected from the group consisting of carrageenan, pectin, algin, and cellulose derivatives.

* * * * *